United States Patent
Holloway

(12) 
(10) Patent No.: US 6,446,386 B1
(45) Date of Patent: Sep. 10, 2002

(54) SEED GERMINATION MEDIUM

(76) Inventor: David Howard Holloway, 56 Northfield Road, Sherfield-on-Lodden, Basingstoke, Hampshire RG27 0DN (GB)

( * ) Notice: Subject to any disclaimer, the term of this patent is extended or adjusted under 35 U.S.C. 154(b) by 0 days.

(21) Appl. No.: 09/530,724

(22) PCT Filed: Oct. 29, 1998

(86) PCT No.: PCT/GB98/03238
§ 371 (c)(1),
(2), (4) Date: Nov. 21, 2000

(87) PCT Pub. No.: WO99/22580
PCT Pub. Date: May 14, 1999

(30) Foreign Application Priority Data

Nov. 5, 1997 (GB) .............................................. 9723411

(51) Int. Cl.$^7$ ................................................. A01C 1/04
(52) U.S. Cl. ............................................................ 47/56
(58) Field of Search ........................................ 47/56, 9

(56) References Cited

U.S. PATENT DOCUMENTS

| | | | |
|---|---|---|---|
| 2,826,865 A | * 3/1958 | Chohamin | 47/56 |
| 2,909,003 A | * 10/1959 | Marshall | 47/56 |
| 3,287,850 A | 11/1966 | Da Valle | |
| 3,299,566 A | 1/1967 | Georges | |
| 4,364,197 A | * 12/1982 | Baron | 47/56 |
| 4,982,526 A | * 1/1991 | Miyachi | 47/56 |
| 5,189,833 A | * 3/1993 | Clark | 47/56 |
| 5,205,068 A | * 4/1993 | Solomou | 46/56 |
| 5,421,123 A | * 6/1995 | Sakate et al. | 47/56 |
| 5,802,763 A | * 9/1998 | Milstein | 47/56 |
| 5,934,011 A | * 8/1999 | Ishioka et al. | 47/56 |

FOREIGN PATENT DOCUMENTS

| | | | |
|---|---|---|---|
| DE | 3515144 A | * | 11/1986 |
| GB | 2 000 077 A | | 1/1979 |
| GB | 2 123 663 A | | 2/1984 |
| GB | 2 270 453 A | | 3/1994 |
| JP | 54-85906 | * | 7/1979 |
| JP | 10-136712 | * | 5/1998 |
| WO | WO 96 07309 A | | 3/1996 |
| WO | WO 96 28010 A | | 9/1996 |

* cited by examiner

Primary Examiner—Peter M. Poon
Assistant Examiner—Jeffrey L. Gellner
(74) Attorney, Agent, or Firm—Lahive & Cockfield, LLP

(57) ABSTRACT

A seed-germination medium, or seed tape, comprising an upper layer formed from a biodegradable material which is permeable to gases but substantially impermeable to water in liquid form; a lower layer formed from a water-absorbent biodegradable material; seeds being disposed beneath the upper layer and the upper layer having a plurality of perforations therein to enable seedlings germinating from the seeds to grow therethrough.

30 Claims, 5 Drawing Sheets

SEED GERMINATION MEDIUM

This invention relates to a seed germination medium for encouraging the germination and establishment of seeds, especially in hostile environments, where water, nutrients, climate, chemical contamination and soil conditions may be limiting factors.

Desertification, salination and soil erosion are significant and increasing problems in many parts of the world. They are typically caused by climatic change, rapidly increasing population, shortage of water and loss of agricultural land to development. This process often places unprecedented pressure for increased productivity from a diminishing and non-renewable land resource. This often leads to contamination of the soil with salts (from contaminated irrigation water and fertiliser use) which eventually makes it impossible to grow food or even cover crops. This in turn accelerates soil degradation and leads to desertification.

One of the few ways to reverse salination is to irrigate contaminated soils with clean water to wash-out the saline contaminants. This is often not possible due to the lack of pure water. An alternative is to establish salt tolerant species (e.g. pistachio, barley and sugar beet), then to minimise water use, and subsequently to 'soak-up' salts in the harvested crops. This is a gradual process which will allow a wider range of less tolerant crops to be grown in the longer term.

Various proposals have been made for providing seed germination media which provide the seeds with water, nutrients and protection during the germination phase.

U.S. Pat. No. 5,189,833 discloses an arrangement in which lawn grass seeds are germinated in a thin layer of growing medium sprayed over a mat of non-woven polypropylene lying on top of an impermeable membrane. After a few days of germination, the mat carrying the seed-bearing medium can be lifted, rolled and then spread over an appropriately conditioned and prepared lawn bed. It will be appreciated that such an arrangement is neither intended nor suitable for growing crops in adverse environmental conditions.

Australian Patent Application AU-A-81394/75 discloses a seed bearing mat comprising upper and lower layers bonded together with a latex adhesive, seeds being bonded between the layers. The lower layer is a water permeable material such as straw, coconut fibres, peat moss or wood shavings whilst the upper or covering layer is formed from material of a finer texture than the lower layer such as coconut fibre dust or sawdust bonded together by latex. The seed bearing mat of AU-A-81394/75 is described as being particularly useful in preparing lawns.

French Patent Application FR-A-2505607 discloses a seed germination medium comprising a folded layer of a transparent plastics material such as polyethylene having bonded to the underside thereof bands of a water-soluble or degradable seed-bearing medium such as paper. In use, the seeds germinate beneath the transparent plastics layer and, as the seedlings grow, they lift the transparent layer away from the water-soluble/degradable medium. Thus the transparent layer is gradually unfolded and carried upwards by the growing seedlings and therefore remains in place over the top of the plants to maintain a greenhouse effect.

French Patent Application FR-A-2440438 discloses a peat-based seed bearing medium comprising a lower layer formed of a water-permeable fibrous material such as cellulose fibres or muslin cloth, an intermediate layer of peat comprising seeds and any additives; and optionally an upper layer which is also water-permeable and can be formed from a material such as muslin. Although FR-A-2440438 discloses that the media are envisaged as being economical for large scale use such as plantations in arid regions e.g. deserts, it is also emphasised that an advantage of the peaty medium, compared with polyethylene sheets, is that it allows the penetration of rain water.

International Patent Application WO-A-96/28010 discloses a seed germination medium in sheet form having upper and lower layers and seeds disposed therebetween. The upper and lower layers are preferably formed from a biodegradable paper material. In order to assist anchoring of the medium in the underlying soil or, in the case of desert areas, sand, the medium is slit longitudinally to enable it to be stretched laterally to form an open lattice. However, it has been found that a problem with the lattice arrangement disclosed in WO-A-96/28010 is that it has a tendency to dry out too quickly. In particular, when stretched to open out the lattice, the edges of the lattice openings lift exposing the lower layer of the medium and increasing water loss. Also, the lifting of the edges of the lattice results in the seeds being lifted away from the soil which acts to inhibit germination of the seedlings, possibly through build up of ethylene in the medium.

It is an object of the present invention to provide a seed germination medium which avoids the problems inherent in many known media and which enables seeds to be germinated effectively in a range of different types of environment, particularly arid and semi-arid areas and areas in which soil salination and desertification has taken hold.

Accordingly, in a first aspect, the invention provides a seed-germination medium comprising an upper layer formed from a biodegradable material which is permeable to gases but substantially impermeable to water in liquid form; a lower layer formed from a water-absorbent biodegradable material; seeds being disposed beneath the upper layer; and the upper layer having a plurality of perforations therein to enable seedlings germinating from the seeds to grow therethrough.

The lower layer is also preferably provided with a plurality of perforations to enable roots emerging from the seeds to grow therethrough.

The biodegradable material from which the upper layer is formed can be partially permeable to water vapour but should nevertheless provide some barrier properties with respect to water vapour. A major function of the upper layer is to minimise loss of water from the medium through evaporation, and to hold seeds in position when exposed to wind, rain or harsh irrigation.

The biodegradable material of the upper layer is preferably a biodegradable polymer. The polymer can be one which contains a biodegradable element and a non-biodegradable element. For example, the polymer can contain, as the non-biodegradable element, a polymer which, in its pure form is impermeable to water, for example polymers such as polyolefins, e.g. polyethylene and polypropylene; polyesters, polyamides, and chlorinated polymers such as polyvinylchloride (PVC). The upper layer can be made of a transparent polymeric material or it can be non-transparent.

The biodegradable element can function as a binder for the non-biodegradable element. Preferably the biodegradable polymer is one which is at least partially degraded by microbial means. For example, the biodegradable polymer can be a material such as a polysaccharide, e.g. starch, a phosphatide, or a glyceride, e.g. a mono-, di- or triglyceride or mixtures thereof such as a vegetable oil, one example of a vegetable oil being soya oil.

One example of a biodegradable material which can be used in the medium of the present invention is a composite material formed from PVC and soya bean oil sold by Linpac, France under the trade name "Degradyl". Another example of a suitable biodegradable polymer is a starch based polymer available from I.C.I. under the trade name "Bioplast".

In an alternative embodiment, the upper layer can be formed predominantly from a biodegradable water permeable material treated to render the upper surface thereof impermeable to liquid water, but partially permeable to water vapour, an example of such a material being a waxed paper.

The lower layer is an absorbent layer which can be made from a wide range of bio-degradable materials including air-laid paper e.g. an air-laid latex bonded paper, for example a paper formed from fluff pulp and a latex binder; waste or recycled paper; or other fibre-based or waste products. The selection of a suitable absorbent material for the lower layer will be dependent on cost, availability of raw materials and water for irrigation; the soil type, irrigation method, degree of capillarity required and the amount of water which must be retained in the medium to facilitate establishment of the seedling. In one preferred embodiment, 38–150 gm/m$^2$ air-laid paper is used to form the lower layer, one such form of materials being available from Walkisoft of Steinfurt, Germany. Such air-laid papers typically contain approximately 85% fluff pulp and 15% latex binder, although greater or lesser amounts of binder can be used as desired.

Where availability of water is not a limiting factor, the lower layer may be relatively non-absorbent, e.g. may be formed from newsprint or other recycled material.

The lower layer can be a single layer or it can comprise a plurality, e.g. two, three or four, of layers. As with the upper layer, the lower layer can be performed to assist the penetration of roots emerging from the seeds, although with plants exhibiting strong root growth, this may be unnecessary. The lower layer can advantageously be coloured or treated to manipulate climatic conditions (e.g. to absorb or reflect heat) and to suppress weed growth below the medium. For example, the medium, or at least the surfaces thereof, can be provided in a variety of colours to assist soil warming/cooling or to exclude light so as to suppress weed growth and aid plant establishment. The medium may have different colours on its upper and lower surfaces to enhance or reduce the absorption of radiation on one surface and produce the opposite effect on its other surface.

The perforations in the upper and lower layers are preferably not in register, thereby ensuring that the medium cannot be expanded to form a lattice in the manner disclosed in WO-A-96/28010. The perforations can be slits or holes of any shape but, in the upper layer, preferably they are in the form of slits. The upper and lower layers can have different numbers of perforations, and the perforations in the respective layers can be of the same general shape or a different shape.

Where the perforations on the upper layer are in the form of slits, they can be for example from about 1 mm to about 5 mm long. The density of the perforations can be, for example, up to about 50,000 per square meter, typically less than 5,000 and greater than 100, for example between 500 and 1,000 per square meter. Where the perforations are not in the shape of slits but are, for example, in the form of circular or ovoidal holes (e.g. needle holes of up to 1 mm diameter) or small rectangular holes (e.g. up to 1 mm wide), the density of perforations preferably is in the range from 500 to 50,000 holes per square meter, typically 1,000 to 10,000.

In one embodiment, the upper layer can be provided with longitudinal slits and the lower layer can be provided with circular or ovoidal slits, for example needle holes, or no perforations at all. The perforation density in the lower layer can advantageously be greater than the density in the upper layer.

It is particularly preferred that the upper layer is provided with slits such as longitudinal slits since it has been found that this assists degradation of the upper layer, the upper layer material tearing along the lines of slits.

The upper and lower layers typically are laminated or bonded together, the strength of the bond between the layers being such as to resist separation by forces exerted by the growing seedling. In this respect, the medium of the present invention is further distinguished from the arrangements disclosed in FR-A-2505607.

The upper and lower layers typically can be bonded together by means of an adhesive or by mechanical means. Bonding the upper and lower layers together ensures good contact and trans-laminar movement of water in the medium. The upper and lower layers should remain closely bonded during laying and the early stages of establishment until the roots of the seedlings have penetrated the lower layer.

Where the upper and lower layers are bonded by means of an adhesive, the adhesive preferably is one which is biodegradable. Preferred adhesives are those which do not significantly affect the absorbency of the lower layer or the semi-permeability of the upper layer. Bonding of the upper and lower layers creates a trans-laminar effect which greatly enhances the movement of water across the medium from an irrigation source. The use of a semi-permeable upper layer reduces water loss from the absorbent layer reducing water demand and thereby assist in arresting salination.

The adhesive is typically one which is non-phytotoxic, and most preferably is water-based. Examples of such adhesives are starch, starch derivatives, polyvinyl alcohol (PVA) and ethylene vinyl acetate (EVA), optionally in combination with other adhesives.

The thickness of the adhesive layer is such that is does not soak the lower layer thereby affecting its absorption capability, its shelf life and the ability of the medium to be rolled and unrolled.

In order to minimise interference between the adhesive and any other components beneath the upper layer, the adhesive may be arranged in a defined pattern, for example a series of discrete regions such as rows, other components as described below being disposed between the discrete regions of adhesive.

Although adhesive bonding between the layers is currently preferred, the upper and lower layers can be bonded together by mechanical means such as by stitching, or stapling, or by piercing one layer through the other. Heat bonding can also be used to bond the upper and lower layers together. In order to achieve heat bonding, the lower layer typically would need to be coated with a heat fusible plastics material in the manner typically used for example with tea bag tissue, a welding tool being used to compress together the areas of the upper and lower layers to be fused together.

In addition to the seeds, a range of optional material can be disposed beneath the upper layer.

For example, fertilizers, micro-nutrients (such as zinc, copper, boron, and seaweed extracts), plant growth promoters and hormones, pH-regulators such as lime and sulphur, salt binding agents such as gypsum (calcium sulphate) and adsorbents such as activated carbon can be incorporated into the medium either by formulating with the adhesive or by application directly to one or other of the internal surfaces as a spray, granule or dust. The pH-controlling agents can be used to control the acidity of the immediate environment, and agents such as gypsum and activated charcoal can minimise the impact of adverse chemical contaminants and salt in the soil or medium, as well as to improve germination, and/or to aid and accelerate plant establishment.

Water retaining substances and wetting agents, which can be synthetic or natural material (such as clay minerals, e.g. bentonite and zeolite clays, or gelatine products, or surfactants such as non-ionic, anionic, cationic and amphoteric surfactants or other wetting adjuvants), can be included to increase the water absorbency of the medium. Examples of such water-retaining substances include silica gels and so-called "super absorbents" such as super absorbent acrylic polymers. In the case of wetting agents, these assist in dispersing the water throughout the medium, and allow less absorbent forms of paper or other substrate to be used.

Pesticides, (e.g. herbicides, fungicides, insecticides and nematicides etc.) can be incorporated beneath the upper layer and preferably between the layers. Although pesticide/ micro-nutrient treated seed can be used, the pesticides can alternatively or additionally be incorporated into, or adsorbed or absorbed onto, the medium. This may reduce the concentration of pesticide (and fertilizer) in direct contact with the seed allowing a broader range of products to be used at higher rates without causing phytotoxicity, reducing the requirement for field applications and dose of active ingredient.

The seeds and optionally seeding agents such as propagation agents of plant, animal and fungal origin can be bonded or held by physical pressure at a pre-determined density between the layers of the medium. The density of seeding will typically depend upon the required plant population and environmental or field factors, for example. The seeds can advantageously be treated with pesticides of the type referred to hereinabove.

Where the lower layer is formed from a plurality of sheets, each separate layer can be impregnated with or carry a different additive. Thus, for example, an upper sheet can carry the seeds whilst plant nutrients can be carried by an underlying sheet.

The medium of the invention can be provided with reinforcing means for increasing its physical strength. The reinforcing means can be made sufficiently robust to enable the use of the medium as a ground anchoring medium in, for example, civil engineering applications. In one embodiment, the reinforcing means can take the form of a mesh made from a metal or plastics material, or can take the from of a fibrous reinforcement, such as a fibrous mat.

Where reinforcing means are present, they are preferably secured to the upper surface of the medium, for example by means of adhesive bonding. By securing the reinforcing means to the upper surface, the medium is held firmly in place. Moreover, irrigation tubes can be placed between the reinforcing means and the medium, the reinforcing means holding the irrigation tubes in place for as long as is required, for example to enable long term maintenance. A particular application of such an arrangement is in the stabilization and maintenance of steep or otherwise unstable embankments such as road and rail embankments, or mining spoil or as a covering on waste disposal landfill sites.

In another aspect, the invention provides a process for stabilising an area of ground (e.g. an embankment, such as a road or rail embankment, or mining spoilage or industrial or domestic waste dump, such as a landfill site) which comprises securing to the ground a seed germination medium as hereinbefore defined.

Either reinforced or non-reinforced medium can be used to stabilise an area of ground but, in cases such as embankments (e.g. roadside embankments) where the ground may be particularly unstable, the reinforced medium may be preferable.

In a further aspect, the invention provides a process for making the medium as hereinbefore defined, the process comprising the steps of:

(i) providing a first web formed from a material which will constitute the lower layer;

(ii) optionally forming a plurality of perforations in the first web;

(iii) depositing seeds onto the first web;

(iv) providing a second web formed from a material which will constitute the upper layer;

(v) forming a plurality of perforations in the second web, where such perforations are not already present;

(vi) optionally depositing adhesive on one or both of the first and second webs; and (vii) bonding the first and second webs together.

In a still further aspect, the invention provides apparatus for manufacturing a medium as hereinbefore defined, the apparatus comprising first and second support means for holding respectively the first and second webs as hereinbefore defined; a bonding station for bonding the first and second webs together; means for advancing the first and second webs towards the laminating station; a seed dispenser upstream of the laminating station for depositing seeds onto the first web; optionally adhesive depositing means upstream of the bonding station for applying adhesive to one or both of the webs (preferably the second web); and optionally means for perforating one or both of the first and second web prior to bonding to form the medium.

The bonding station can take the form of a pair of rollers, the first and second webs being conveyed through the nip between the rollers, for example after adhesive has been applied to one or both of the webs, the rollers exerting pressure on the webs to bring about bonding therebetween. The rollers preferably are relatively soft, or at least have a resilient surface, so that the seeds are not damaged as the webs pass between the rollers. Alternatively, bonding can be achieved by applying tension to the finished roll of medium. The adhesive can be deposited on the web(s) in the form of a spray (which can be for example an electrostatic spray), or by means of a roller or brushes. Preferably adhesive is deposited on the second web, and more preferably no adhesive is deposited on the first web. When bonding is to be carried out by mechanical means rather than by adhesive, such mechanical means can be provided at the bonding station.

The formation of the perforations in each web can be effected by passing the web over or through a cutter. The cutter can take the form of a pair of rollers, one having a plurality of cutting elements and the other having a plurality of complimentary recesses for receiving the cutting elements, the web being conveyed through the nip between the rollers.

In a still further aspect, the invention provides a cutter roller for use in the apparatus of the invention, the cutter roller having a plurality of axially spaced cutting elements (such as a cutter wheel), each cutting element having a plurality of cutting edges disposed around the circumference thereof, the cutting edges of the cutter roller being configured such that in use on a substrate they cut a line of spaced apart perforations, preferably elongate slits, into the substrate.

In one embodiment, the cutter roller comprises a drive shaft having mounted thereon a plurality of cutter wheels and a plurality of spacer elements, the spacer elements being interposed between adjacent cutter wheels so as to space the cutter wheels apart. The drive shaft can have one or more slots or protrusions or other keying means which cooperate with complimentary formations on the cutter wheels and optionally the spacers so as to hold at least the cutter wheels against relative rotation with respect to the drive shaft.

The cutter wheels have a plurality of cutting edges spaced (preferably regularly) around their circumference. The cutting edges are typically arcuate in form and can be arranged in either a continuous or discontinuous array. For example, in a discontinuous array, the cutter wheel can have a plurality of cutting edges separated by non-cutting edges of a smaller radius than the cutting edges, the cutting and non-cutting edges having substantially concentric radii. In a continuous array, the cutting edges can have, for example, a substantially sinusoidal form.

In another aspect, the invention provides an adhesive composition suitable for use in the matrices as hereinbefore defined, the adhesive comprising a water soluble or water dispersible adhesive polymer such as PVA and one or more (preferably two or more) agents selected from pesticides (for example herbicides, fungicides, insecticides, nematicides), plant micronutrients (such as zinc, copper, boron), organic and inorganic fertilisers, plant growth regulators (e.g. seaweed extract), plant growth promoters and hormones, buffering agents and pH regulators (e.g. lime and sulphur), and salt binding agents such as gypsum (calcium sulphate).

The invention will now be illustrated, but not limited by reference to the particular embodiments shown in the accompanying drawings of which:

Figure 1:
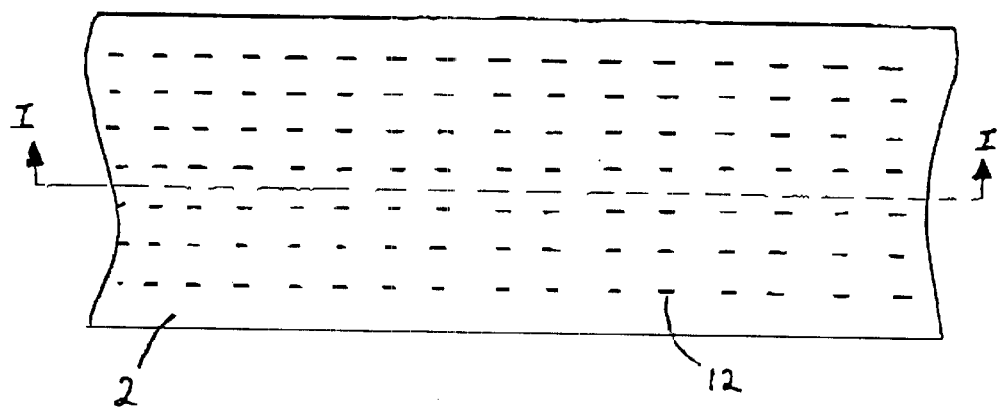
FIG. 1 is a view from one side of a length of medium according to one embodiment of the invention.
Figure 2:
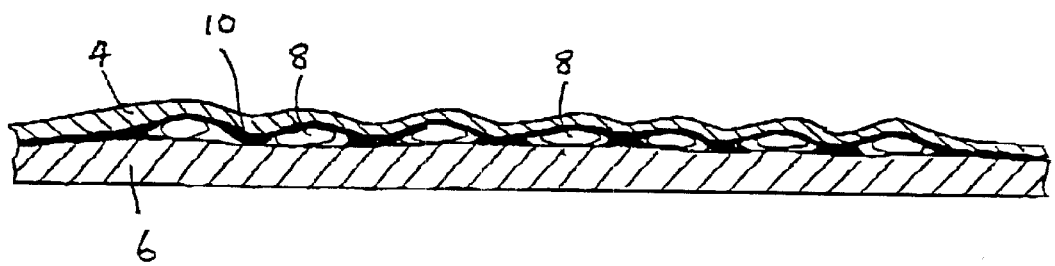
FIG. 2 is a sectional elevation along line I—I in FIG. 1.

Referring now to FIGS. 1 and 2, a medium 2 according to one embodiment of the invention comprises an upper layer 4 and a lower layer 6. Upper layer 4 is formed from a biodegradable polymer which is permeable to gases, partially permeable to water vapour but is impermeable to water in liquid form. One such polymer is "Degradyl" which is a biodegradable form of PVC containing soya oil as a plasticiser, and which is available from LIN PAC, Noyal-Pontivi, France. Lower layer 6 is formed from a 38–150 gm/m$^2$ grade of air-laid paper such as the 38 g air-laid paper available from Walkisoft GMBH, Steinfurt, Germany.

Disposed between the upper and lower layers 4,6 are seeds 8 which may optionally be coated with one or more pesticide. Other desirable agents can also be disposed between the layers, examples being super-absorbent substances for increasing the water carrying/retaining capacity of the medium (such as "SwellGel" Water Storing Granules—available from Glowcroft Ltd, Gloucester, UK.).

The upper and lower layers 4,6 are bonded together by means of a water soluble or water dispersible adhesive layer 10 which, in this embodiment, comprises PVA. The PVA can contain one or more agents such as pesticides (for example herbicides, fungicides, insecticides, nematicides), plant micronutrients (such as zinc, copper, boron), organic and inorganic fertilisers, plant growth regulators (e.g. seaweed extract), plant growth promoters and hormones, buffering agents and pH regulators (e.g. lime and sulphur), and salt binding agents such as gypsum (calcium sulphate).

Both the upper and lower layers 4,6 are perforated by an array of slits, the slits in the upper layer 4 being denoted by the number 12 in FIG. 1, and the slits in the lower layer 6 not being shown. The slits in the upper and lower layers 4,6 are not in register and therefore the medium cannot be opened out into a lattice form in the manner of the medium shown in WO 96/28010.

An apparatus for manufacturing the medium of FIGS. 1 and 2 is shown in FIGS. 3 to 6. Thus the apparatus comprises a spindle 20 upon which is mounted a roll 22 of the air-laid paper which will constitute the lower layer 6; and a spindle and roll core 24 upon which the finished medium is collected. Located between the spindles 20 and 24 are a pair of cutter rollers 26 (which can be omitted if perforations are not required on the lower layer), a pair of laminating rollers 28 defining a laminating station, and a drive roller 30. Drive roller is driven by means of a drive belt (not shown) linked to a motor (also not shown).

Seed dispensing hoppers or "seed drills" 32 are mounted above the cutter rollers 26 and laminating rollers 28. The seed drills may be of various types depending upon the desired seed distribution on the lower layer. For example, grass seeds could typically be broadcast onto the lower layer whereas row crops such as tobacco could typically be accurately placed in rows using a precision drill(s), e.g. a commercially available precision drill used in general agriculture.

Mounted above drive roller 30 is a spindle 34 upon which is mounted a roll 36 of the biodegradable PVC material which will constitute the upper layer 4. Disposed between the spindle 34 and the laminating rollers 28 are a pair of cutter rollers 38, and mounted above the laminating rollers 28 is a spray head 40 connected to a supply of aqueous adhesive (not shown).

In use, a web 22a of the air-laid paper is drawn along by drive roller 30 through the cutter rollers 26, where an array of longitudinal slits 10 is cut into the web 22a, and towards the rollers 28 of the laminating station. Between the cutter rollers 26 and the laminating station, seeds 42 are deposited onto the web 22a from the seed drill 32. A web 36a of the biodegradable PVC material from the roll 36 is drawn through cutter rollers 38 by the drive roller 30 towards the laminating rollers 28 but, immediately before the laminating rollers, the web 36a is sprayed with an adhesive composition from spray head 40. Webs 22a and 36a converge at the laminating rollers 28 where they are compressed firmly together under a pressure sufficient to bring about good bonding between the webs but not so great that the seeds are damaged. After the bonding stage, the resulting laminar medium is wound onto roll core 24. At this stage, some water from the adhesive may still remain in the paper, held by the more absorbent lower web 22a. Allowing the web to retain some water can lead to partial germination of the seed or initiation of the germination step. This can be advantageous in certain circumstances and, for example, can help to bring about more rapid establishment of the plant when the medium is put to use. However, if desired, in order to reduce the water content of the glue, the webs 22a, 36a may optionally be conveyed through an oven, drier or air-knife prior to winding onto roll 24. Removal of the water prior to storage assists in maintaining a prolonged shelf life for the medium.

The size of the rolls of medium formed according to the foregoing process will depend upon the raw material, the intended method of laying (by agricultural machinery or by hand), and the area intended to be covered. However, purely by way of example, the rolls can be up to 4200 meters in length, and may cover up to about 0.5 hectares or more.

In the process described above, the upper and optionally the lower webs are slit by cutter rollers. However, instead of cutting the slits during the process, one or both of the webs can be pre-cut. In certain instances, the lower layer 6 of the medium need not be cut at all, the rooting strength of the germinating seedling being sufficient to force a way through the lower surface of the medium.

Figure 4:
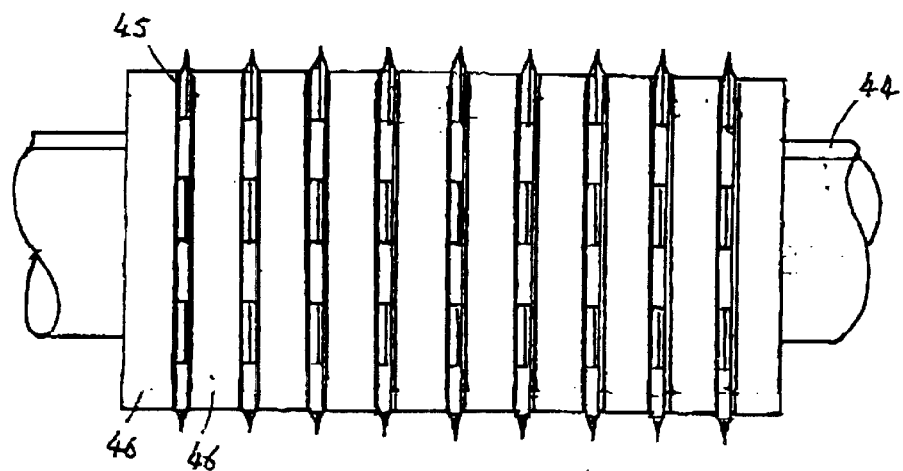
FIG. 4 is a side view of a cutter roller of the type used in the apparatus of FIG. 3.
Figure 5:
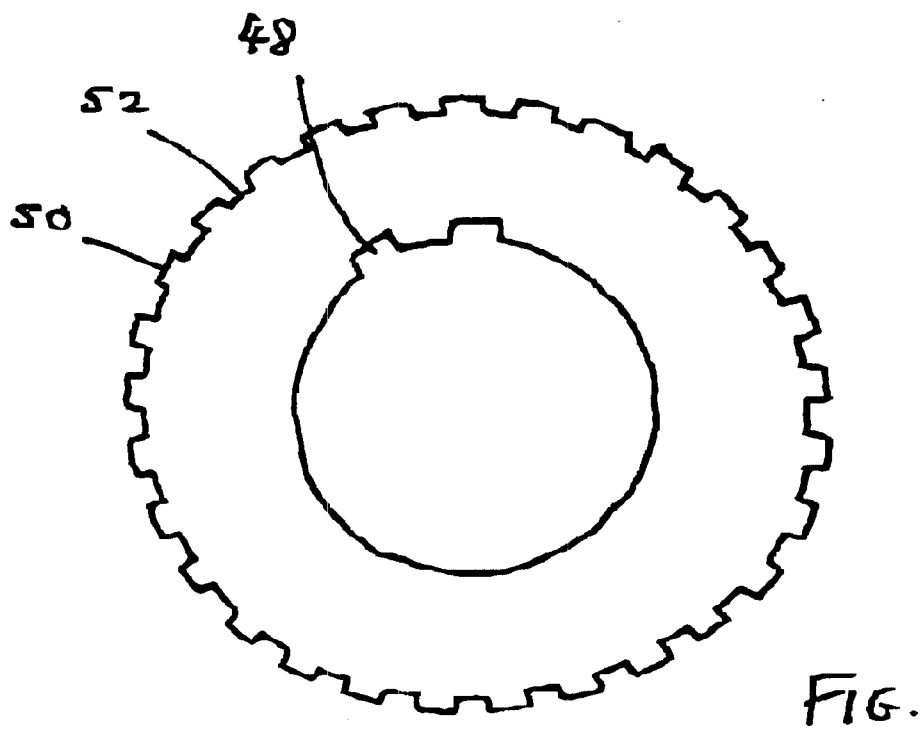
FIG. 5 is a side view of a cutter wheel for use in the cutter roller of FIG. 4.
Figure 6:
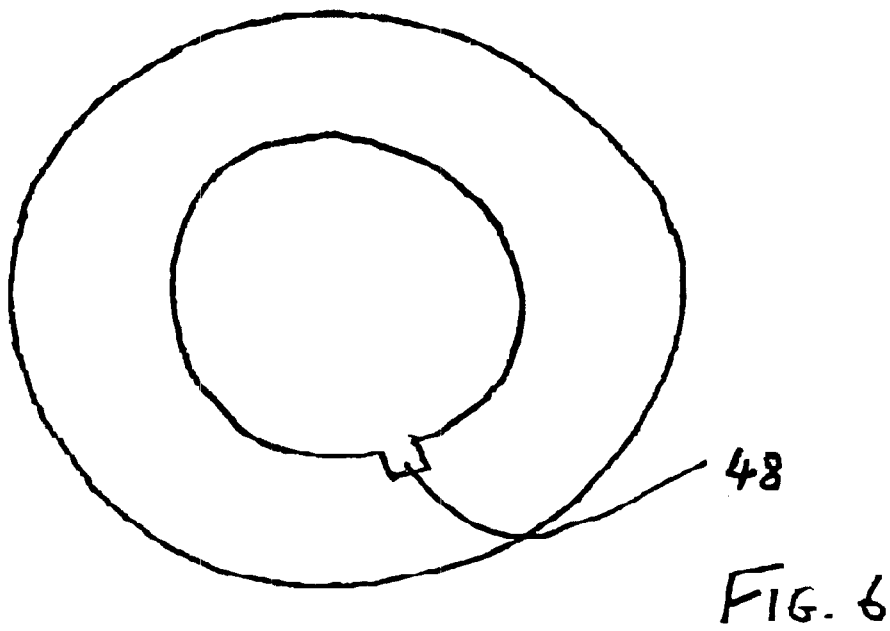
FIG. 6 is a side view of a spacer wheel for use in the cutter roller of FIG. 4.

Typical cutter rollers 26/38 used in the apparatus of the invention are shown in FIGS. 4 and 6. Each cutter roller comprises a central spindle or drive shaft 42 which has a spline 44 extending along its length for engaging corresponding key slots 48 on cutter wheels 45 and spacers 46. Each drive shaft 42 has mounted thereon a plurality of the cutter wheels 45 and spacers 46, a spacer 46 being disposed between each pair of cutter wheels. The cutter wheels can have a blade configuration as shown in FIG. 5, whilst a spacer wheel can be constructed as shown in FIG. 6. The cutter wheel shown in FIG. 5 has an array of discontinuous regularly spaced cutting edges or teeth 50 interrupted by non-cutting edges 52. The radii of the cutting edges 50 and the non-cutting edges 52 both extend from the same axis of rotation, and hence are concentric. However, as an alternative, the cutter wheel can have a continuous edge, for example of a generally sinusoidal profile, the peaks of the sinusoidal form serving as the cutting edges and the troughs serving as non-cutting edges.

Figure 7:
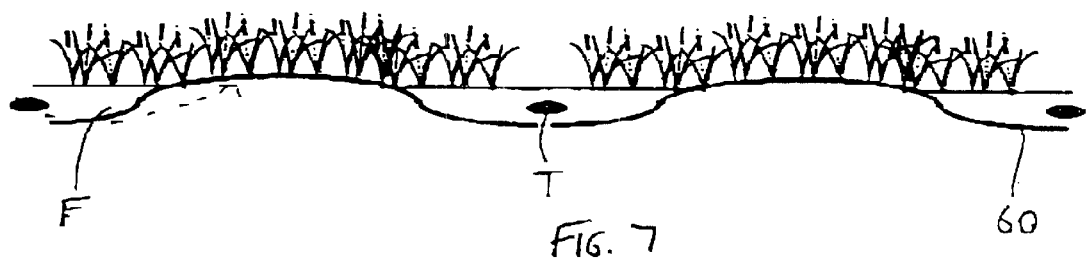
FIG. 7 is a schematic illustration of one mode of use of the medium of the invention.

The seed germination medium of the invention can be laid using existing agricultural or horticultural equipment, for example the machinery typically used for laying polyethylene sheeting, or crop mulching equipment. In general, the soil or ground can be prepared in advance of the laying to produce a relatively smooth clod free bed. Furrows F are then opened up on either side of the medium and the medium is partially buried as shown in FIG. 7. Burying the edges 60 of the medium helps to hold it in place against the action of, for example, winds. Trickle irrigation tubes T can be incorporated at laying or the medium may be wetted utilizing overhead, ditch or flood irrigation. As much of the medium as possible should be covered to assist establishment and reduce water consumption although the medium can be laid on the surface if necessary and an appropriate securing system used. Once wetted, the medium will retain moisture to allow the seeds to germinate. Ideally little or no further moisture should be applied to encourage rapid deep rooting and self sustainability. However, this may not be practical in all situations and additional water may be required in some situations. As an alternative to trickle irrigation, a form of flood irrigation could be used by laying the medium into a depression in the ground, which may formed manually or by the equipment used to lay the medium, and allowing or causing water to run over the surface of the upper layer.

Figure 8:
FIG. 8 is a schematic illustration of one mode of use of a modified form of the medium.

An alternative form of the medium is shown in FIG. 8. In this embodiment, the edges 66 of the upper polymeric layer have been folded back and bonded to form trickle irrigation tubes. It is envisaged that this embodiment could be used in relatively light soils where the medium is unlikely to be damaged by laying equipment.

Figure 9:
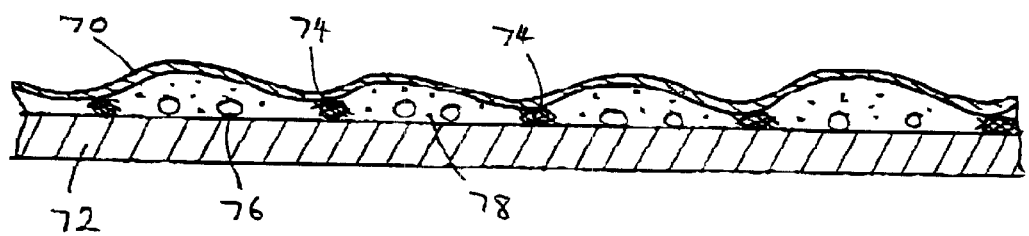
FIG. 9 is a schematic sectional elevation through a medium according to a further embodiment of the invention.
Figure 3:
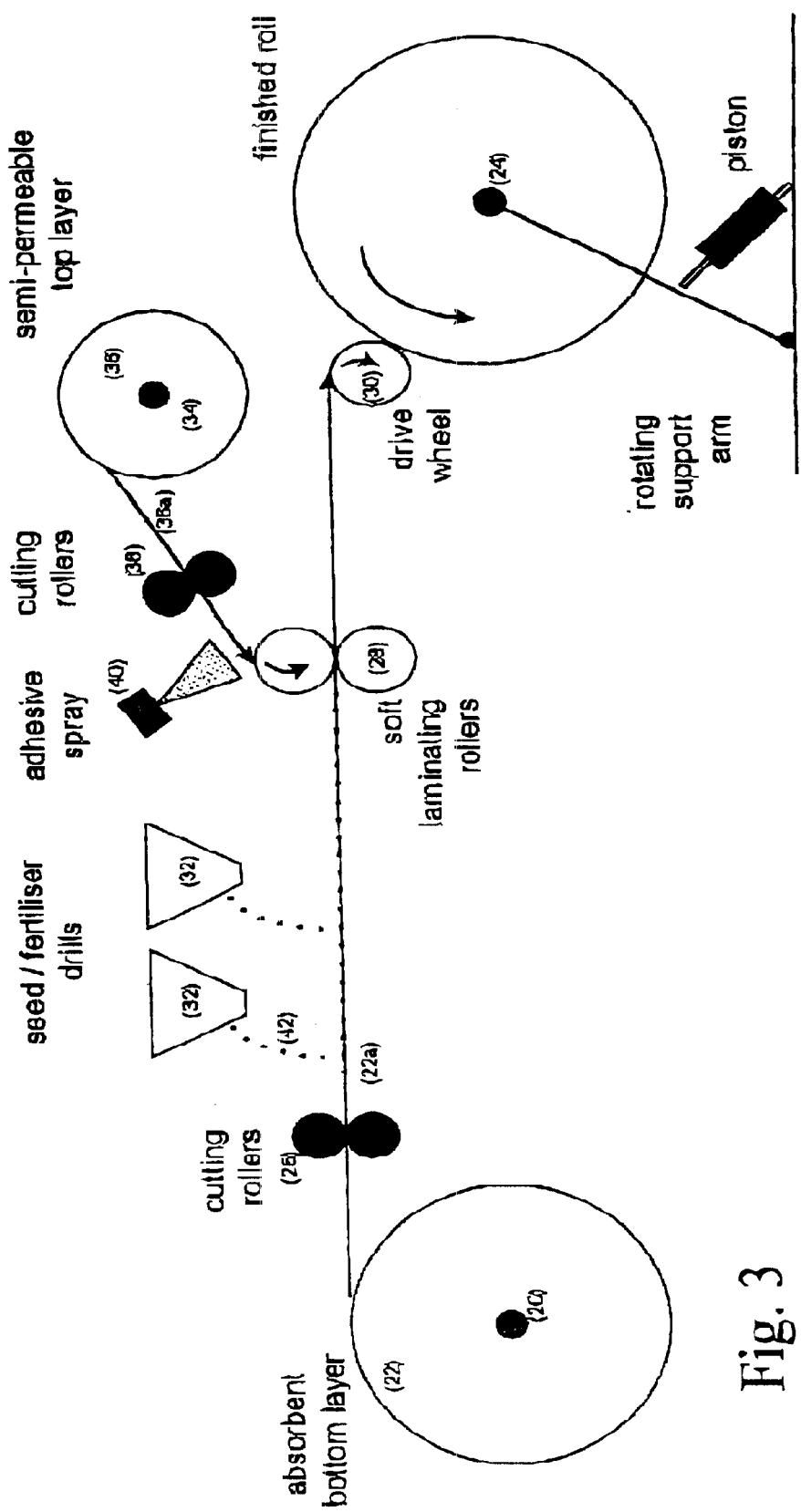
FIG. 3 is a sectional side elevation of an apparatus for manufacturing a medium of the type shown in FIGS. 1 and 2.

A further alternative form of the medium is shown in FIG. 9. In this embodiment, the upper layer 70 and lower layer 72 are bonded together by means of adhesive arranged in rows 74. The seeds 76 and optionally additives 78 are disposed between the rows, the arrangement ensuring that the seeds and additives do not interfere with the adhesive and prevent a firm bond from being formed between the layers.

The advantage of the medium of the present invention is that it provides a protected local environment which is favourable to the germination of seeds and the subsequent development of seedlings. The medium has a substantially reduced water demand compared to conventional overhead and trickle irrigation systems, and can be applied to land using existing plastics/mulch laying equipment. A further benefit of the medium is its compatibility with existing trickle, overhead, trench and flood irrigation systems. Once the medium has been laid, there is a minimal requirement for additional irrigation. If desired, however, a trickle irrigation system can be incorporated into the medium at manufacture. Further substantial advantages are the ease of manufacture of the medium and its long shelf life. Moreover, the medium can be used in both hostile and normal agricultural situations.

Figure 10:
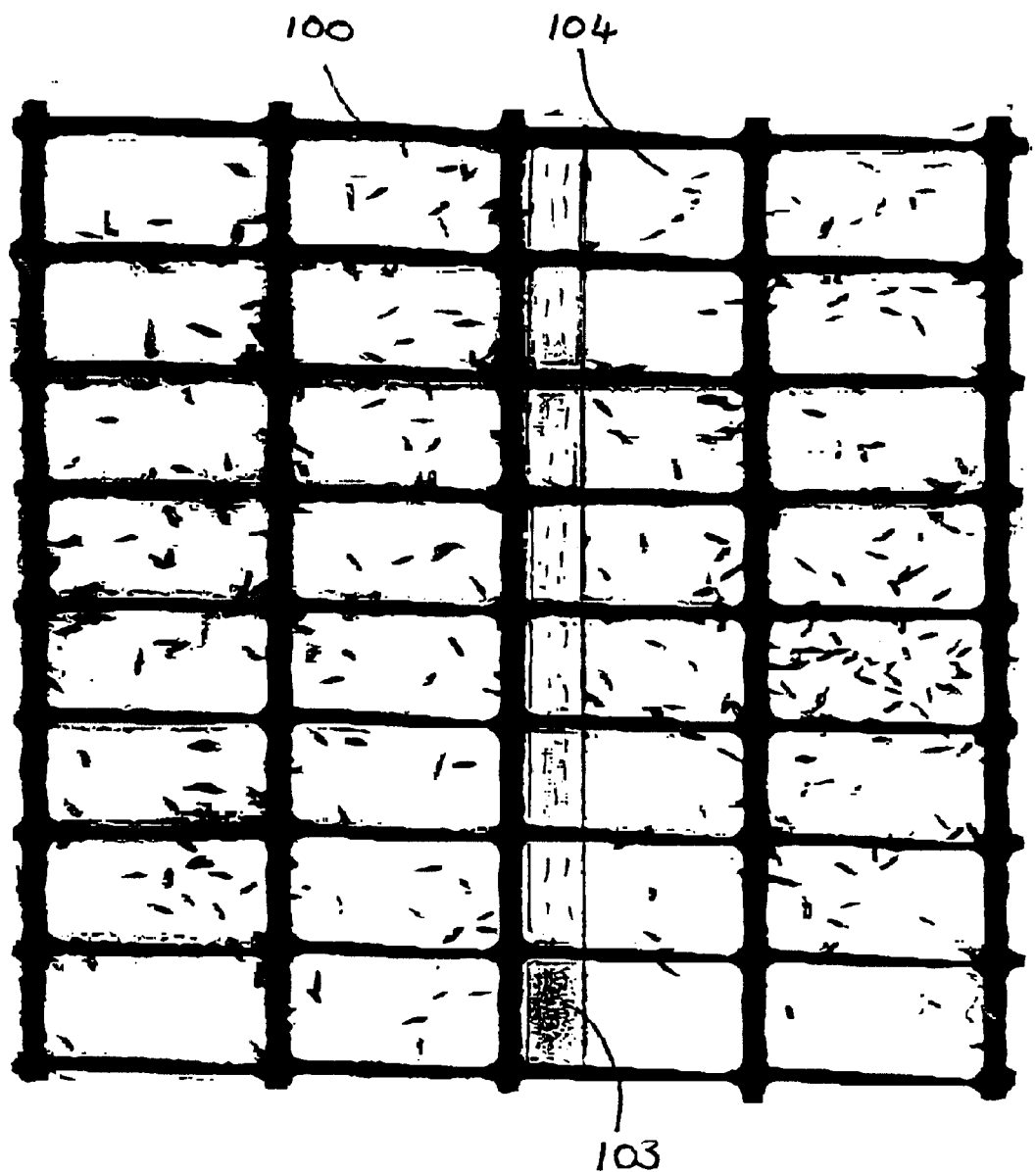
FIG. 10 is a plan view of a reinforced medium according to another embodiment of the invention.

FIG. 10 illustrates an embodiment in which the medium has the same basic laminar structure as the embodiments of the preceding Figures but which incorporates in addition a reinforcing mesh layer 100 which is secured by means of an adhesive to the upper layer 104. Reinforcing mesh 100 in this embodiment is formed from a plastics material such as polypropylene or a polyamide but could equally be formed from a metal (e.g. a wire mesh) or a plastics coated metal material. In FIG. 10, irrigation tubes 103 are positioned between the mesh 100 and the upper layer 104 of the medium, but such irrigation tubes can be omitted if desired. The reinforced medium of FIG. 10 is particularly useful in stabilising unstable ground or covering ground where it would otherwise be difficult for vegetation to take root. Examples of such situations are roadside or railway embankments where the combination of the steepness of the band and, in many cases, lack of binding factors such as plant and tree roots can cause the ground, or at least the topsoil, to slide unless stabilised. Other examples are newly created roadside embankments, which may have been formed by cutting through rock or a chalk layer, or may have been created by piling up rocks or stones and holding in place with a metal restraining mesh, where plant growth takes place only with difficulty because of the lack of a suitable soil base. In such situations, the reinforced medium of the invention serves not only to promote plant growth, thereby eventually creating a network of roots which will help prevent ground movement, but also provides mechanical stabilisation of the ground whilst the seedlings and plants become established.

It will readily be apparent that numerous alterations and modifications could be made to the medium shown in the accompanying drawings without departing from the principles underlying the invention and all such modifications and alterations are intended to be within the scope of this application.

What is claimed is:

1. A seed-germination medium comprising an upper layer formed from a biodegradable material which is permeable to gases but substantially impermeable to water in liquid form; a lower layer formed from a water-absorbent biodegradable material; seeds being disposed beneath the upper layer; and the upper layer having a plurality of perforations therein to enable seedlings germinating from the seeds to grow therethrough, wherein the upper and lower layers form a laminar structure and are bonded together by means of an adhesive.

2. A seed-germination medium according to claim 1, wherein the lower layer comprises a plurality of perforations to enable roots emerging from the seeds to grow therethrough.

3. A seed-germination medium according to claim 1, wherein the biodegradable material from which the upper layer is formed is partially permeable to water vapor.

4. A seed-germination medium according to claim 1, wherein the biodegradable material comprises a biodegradable polymer.

5. A seed-germination medium according to claim 4, wherein the biodegradable polymer comprises a biodegradable element and a non-biodegradable element.

6. A seed-germination medium according to claim 5, wherein the non-biodegradable element of said biodegradable polymer comprises a polymer which, in its pure form, is impermeable to water.

7. A seed-germination medium according to claim 6, wherein the non-biodegradable element comprises a polymer selected from the group consisting of polyolefins, polyesters, polyamides, and chlorinated polymers.

8. A seed-germination medium according to claim 5, wherein the biodegradable element functions as a binder for the non-biodegradable element.

9. A seed-germination medium according to claim 8, wherein the biodegradable element is one which is at least partially degraded by microbial means and/or by sunlight.

10. A seed-germination medium according to claim 9, wherein the biodegradable element is formed of a material selected from the group consisting of polysaccharides, phosphatides, and glycerides, and mixtures thereof.

11. A seed-germination medium according to claim 10, wherein the biodegradable element is constituted by a vegetable oil.

12. A seed-germination medium according to claim 10, wherein the biodegradable material comprises a composite material containing PVC and soya bean oil or a starch binder.

13. A seed-germination medium according to claim 1, wherein the lower layer is made from one of air-laid, waste and recycled paper.

14. A seed-germination medium according to claim 13, wherein the lower layer is formed from between 38–150 gm/m$^2$ of air-laid paper.

15. A seed-germination medium according to claim 1, wherein the lower layer is colored or treated to absorb or reflect heat.

16. A seed-germination medium according to claim 1, wherein both of said upper and lower layers comprise perforations, and wherein the perforations in the upper and lower layers are not in registration relative to each other.

17. A seed-germination medium according to claim 1, wherein the adhesive is biodegradable.

18. A seed-germination medium according to claim 1, wherein the adhesive is non-phytotoxic and is water-based, and is selected from the group consisting of starch, polyvinyl alcohol (PVA) and ethylene vinyl acetate (EVA).

19. A seed-germination medium according to claim 1, wherein the adhesive is arranged in a substantially continuous layer between the upper and lower layers.

20. A seed-germination medium according to claim 1, wherein the adhesive is arranged in discontinuous discrete regions such as rows.

21. A seed-germination medium according to claim 1, wherein the upper and lower layers are bonded together by mechanical means.

22. A seed-germination medium according to claim 1, wherein in addition to the seeds, disposed beneath the upper layer are one or more agents selected from the group consisting of fertilizers, micro-nutrients, buffering agents, water absorbing and retaining materials, and pesticides.

23. A seed-germination medium according to claim 1, further comprising the reinforcements means incorporated into or secured to the medium.

24. A seed-germination medium according to claim 23, wherein the reinforcement means is secured to a surface of the medium.

25. A seed-germination medium according to claim 24, wherein the reinforcement means is secured to an upper surface of the medium.

26. A seed-germination medium according to claim 23, wherein the reinforcing means is in the form of a mesh, or woven or non-woven fibrous mat.

27. A seed-germination medium according to claim 26, wherein the reinforcing means is mesh is formed from a material selected from the group consisting of plastics material, a metal material and a plastics-coated metal material.

28. A method for making a seed-germination medium as defined in claim 1, the process comprising the steps of:
(i) providing a first web formed from a material which will constitute the lower layer;
(ii) optionally forming a plurality of perforations in the first web;
(iii) depositing seeds onto the first web;
(iv) providing a second web formed from a material which will constitute the upper layer;
(v) forming a plurality of perforations in the second web, where such perforations are not already present;
(vi) depositing adhesive on one or both of the first and second webs; and
(vii) bonding the first and second webs together.

29. A process for stabilizing an area of ground which comprises securing to the ground a seed-germination medium as defined in claim 1.

30. A process for stabilizing an area of land which comprises covering the area of land with a medium as defined in claim 1.

* * * * *